US007774026B2

(12) United States Patent
Hayashi et al.

(10) Patent No.: US 7,774,026 B2
(45) Date of Patent: Aug. 10, 2010

(54) MOBILE COMMUNICATION TERMINAL AND STORAGE MEDIUM

(75) Inventors: Yosuke Hayashi, Yokosuka (JP); Naomasa Yoshida, Yokohama (JP)

(73) Assignee: NTT DoCoMo, Inc., Chiyoda-ku (JP)

( * ) Notice: Subject to any disclaimer, the term of this patent is extended or adjusted under 35 U.S.C. 154(b) by 1053 days.

(21) Appl. No.: 11/442,218

(22) Filed: May 30, 2006

(65) Prior Publication Data

US 2007/0002735 A1 Jan. 4, 2007

(30) Foreign Application Priority Data

Jun. 10, 2005 (JP) ............... 2005-171160

(51) Int. Cl.
*H04B 1/38* (2006.01)
*H04M 1/00* (2006.01)
(52) U.S. Cl. ............... 455/557; 455/558; 455/412.1; 455/435.1
(58) Field of Classification Search ............... 455/550.1, 455/517, 419, 435.1, 435.2, 551, 412.2, 435.3, 455/452.1, 556.1, 557, 558, 412.1, 434, 67.11, 455/446, 422.1; 370/229, 349; 709/219
See application file for complete search history.

(56) References Cited

U.S. PATENT DOCUMENTS

| 6,044,265 | A * | 3/2000 | Roach, Jr. ............... 455/419 |
| 6,925,302 | B2 * | 8/2005 | Kojima et al. ............ 455/435.3 |
| 6,965,773 | B2 | 11/2005 | Basson et al. |
| 2002/0058519 | A1 | 5/2002 | Nagahara |
| 2003/0099197 | A1 * | 5/2003 | Yokota et al. ............... 370/230 |
| 2004/0203661 | A1 | 10/2004 | Lee |
| 2004/0249693 | A1 | 12/2004 | Sako |
| 2005/0074019 | A1 * | 4/2005 | Handforth et al. ........... 370/406 |
| 2005/0130611 | A1 * | 6/2005 | Lu et al. ............... 455/130 |
| 2006/0182076 | A1 * | 8/2006 | Wang ............... 370/338 |
| 2007/0143444 | A1 * | 6/2007 | Kamiya et al. ............. 709/219 |

FOREIGN PATENT DOCUMENTS

| JP | 2001-78260 A | 3/2001 |
| JP | 2002-044150 A | 2/2002 |

(Continued)

OTHER PUBLICATIONS

Korean Office Action dated Jan. 25, 2007 (Four (4) pages).

(Continued)

*Primary Examiner*—John Lee
(74) *Attorney, Agent, or Firm*—Crowell & Moring LLP

(57) ABSTRACT

Such regulation control that the processing load on the network side is low and, furthermore, particular services are not regulated is realized. A regulation table is stored in a mobile communication terminal 1. When regulation level information is indicated by a maintenance device 4, transmission regulation control for regulating transmission operation is performed based on the content of the regulation table. In this case, it is possible to regulate particular services which use packet communication, while it is also possible to avoid regulating particular services. Since the maintenance device 4 only indicates regulation level information indicating which part in the regulation table should be used and does not indicate the content of regulation, the processing load on the network side is low.

15 Claims, 4 Drawing Sheets

FOREIGN PATENT DOCUMENTS

| | | |
|---|---|---|
| JP | 2004-173193 | 6/2004 |
| JP | 2005-5836 A | 1/2005 |
| JP | 2005-039588 | 2/2005 |
| KR | 10-2004-0048275 A | 6/2004 |
| KR | 10-2004-0107132 A | 12/2004 |
| TW | 571522 | 4/1991 |
| TW | 582153 | 3/2001 |
| WO | WO 01/22682 A2 | 3/2001 |
| WO | WO 01/28266 A1 | 4/2001 |

OTHER PUBLICATIONS

1. Taiwan Office Action w/Translation (5 pages).

\* cited by examiner

| REGULATION LEVEL | PERMISSION LIST | NON-PERMISSION LIST |
|---|---|---|
| Level 1 | imode. docomo. co. jp | — |
| Level 2 | — | VoIP. docomo. co. jp<br>mopera. nttdocomo. co. jp |
| Level 3 | | — |
| .... | | |

|  |  | UIM | |
|---|---|---|---|
|  |  | AVAILABLE | NOT AVAILABLE |
| TERMINAL | CAPABLE OF STORAGE | UIM STORAGE UNIT | STORAGE UNIT |
| | INCAPABLE OF STORAGE =WITHOUT CAPABILITY | — | — |

MOBILE COMMUNICATION TERMINAL AND STORAGE MEDIUM

BACKGROUND OF THE INVENTION

1. Field of the Invention

The present invention relates to a mobile communication terminal and a storage medium, and in particular to a mobile communication terminal which is provided with a service with the use of a packet connection communication channel in a mobile communication network, and a storage medium used for the mobile communication terminal.

2. Description of the Related Art

Access regulation control regulated by 3 GPP as a current mobile communication control method is realized only as two levels of regulation, that is, CS (circuit switching) regulation and PS (packet) regulation. Hereinafter, access regulation in a time of disaster will be required to be performed not by uniform regulation of packet communication but by higher-level regulation for each service, when consideration is given to VoIP on the IMS (IP Multimedia Subsystem) and the like.

In implementing access regulation, it must be considered that a connection request signal itself from a mobile machine to a network can be a congestion factor. If a network is congested, it is necessary to eliminate the congestion and recover the network to a normal condition. As an example of conventional techniques of this kind, there is a technique described in JP2005-5836A. In JP2005-5836A, there is described a technique in which congestion is monitored for each part of a server or for each URL, and, if congestion is detected, control is implemented to eliminate the congestion.

In JP2002-44150A, there is described a technique in which congestion is eliminated by implementing regulation based on the type of an application associated with a packet.

In the conventional techniques described above, there is a problem that, when regulation is implemented, regulation control based on the processing performed on the network side is required, and the processing load is heavy.

In the case of urgency, such as the case of disaster occurrence, it is necessary to implement control in a manner that particular services, such as a safety confirmation message board service, are not regulated.

If packet communication is uniformly regulated, it is not desirable that VoIP on a packet communication service is also regulated in a time of disaster. Therefore, realization of appropriate regulation control is desired.

The present invention has been made to solve the above problems of the conventional techniques, and its object is to provide a mobile communication terminal capable of realizing such regulation control that the processing load on the network side is low and particular services are not regulated, and a storage medium used for the mobile communication terminal.

SUMMARY OF THE INVENTION

The mobile communication terminal according to claim 1 of the present invention is characterized in comprising: storage means for storing a regulation table in which regulation rules for regulating transmission operation of the terminal are defined (for example, corresponding to the storage unit 12 in FIG. 3), and transmission regulation control means for regulating transmission operation based on the content of the regulation table stored in the storage means (for example, corresponding to step S508 in FIG. 5). By performing transmission regulation control in the terminal, the processing load of the network side can be reduced.

The mobile communication terminal according to claim 2 of the present invention is the mobile communication terminal according to claim 1 characterized in that the transmission regulation control means regulates transmission operation related to each service which is provided with the use of packet communication. In the case of urgency, regulation control can be appropriately realized, for example, such regulation control that particular services are not regulated. For example, it is possible to perform such control that allows preferential access to the imode (registered trademark) disaster message board, and thereby, provision of communication in a time of disaster can be controlled as flexibly as possible.

The mobile communication terminal according to claim 3 of the present invention is the mobile communication terminal according to claim 1 characterized in that the transmission regulation control means refers to the content of the regulation table according to regulation level information provided from outside to regulate transmission operation. Only by specifying the regulation level information from the network side, transmission regulation control is performed in the terminal. Thereby, the processing load on the network side can be reduced.

The mobile communication terminal according to claim 4 of the present invention is the mobile communication terminal according to claim 1 characterized in that it further comprises rewriting means for rewriting the content of the regulation table, and that the transmission regulation control means regulates transmission operation based on the content of the regulation table rewritten by the rewriting means. It is possible to flexibly change the content of regulation by rewriting the content of the regulation table.

The mobile communication terminal according to claim 5 of the present invention is the mobile communication terminal according to claim 1 characterized in that the storage means is removable from the terminal (for example, corresponding to the UIM 16 in FIG. 4). By removably configuring the storage medium for the regulation table, regulation control can be similarly performed even in the case of using a different terminal.

The storage medium according to claim 6 of the present invention is a storage medium which is removable from a mobile communication terminal characterized in that a regulation table is stored therein which specifies regulation rules for regulating transmission operation of the mobile communication terminal equipped with the storage medium, and that transmission operation of the mobile communication terminal is regulated based on the content of the regulation table. By performing transmission regulation control in the terminal equipped with the storage medium, the processing load on the network side can be reduced.

As described above, the present invention is advantageous in that, by performing transmission regulation control in a terminal, the processing load on the network side can be reduced. It is also advantageous in that, by controlling regulation on transmission operation related to each of higher-level services provided with the use of packet communication, such regulation control that particular services are not regulated can be realized in the case of urgency such as the case of disaster occurrence.

DETAILED DESCRIPTION OF THE PREFERRED EMBODIMENTS

Figures 1, 2:
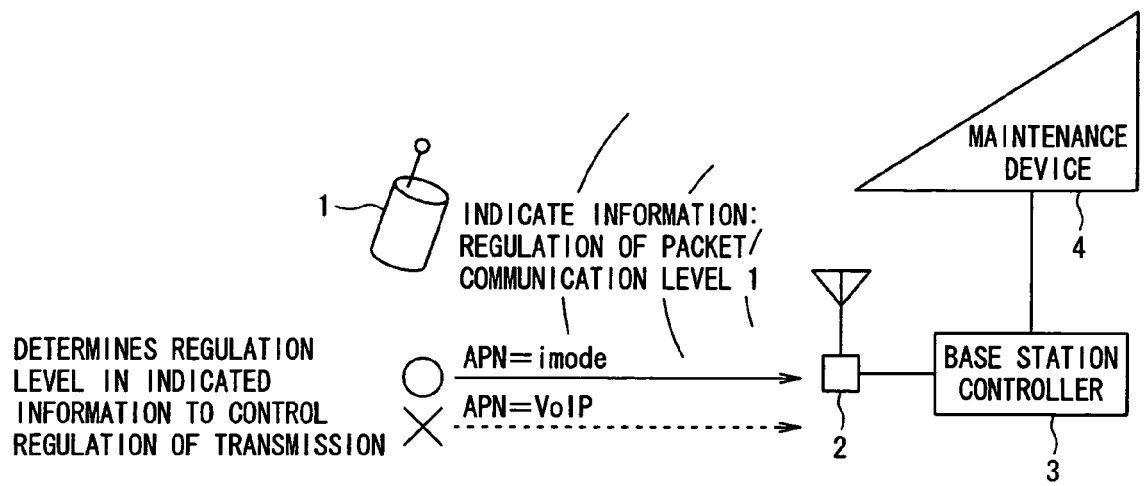
FIG. 1 is a block diagram showing the schematic configuration of a communication system using a mobile communication terminal according to the present invention.
FIG. 2 shows an example of a regulation table.

An embodiment of the present invention will be described below with reference to drawings. In each of figures referred to in the description below, the portions similar to those in the other figures are denoted by the same reference numerals.

(Configuration of the Entire System)

FIG. 1 is a block diagram showing the schematic configuration of a communication system using a mobile communication terminal according to the present invention. The communication system shown in the figure is configured to include a mobile communication terminal 1 having a function of controlling regulation of transmission by the terminal, a base station 2 for realizing a communication area, a base station controller 3 for controlling the base station 2 and a maintenance device 4 for setting a regulation level and indicating the set level to the mobile communication terminal 1.

In the figure, a regulation table to be described later is stored in the mobile communication terminal 1. When regulation level information is indicated by the maintenance device 4, transmission regulation control for controlling transmission operation is performed based on the content of the regulation table. In this case, it is possible to regulate particular services which use packet communication, while it is also possible to avoid regulating particular services.

The maintenance device 4 only provides regulation level information indicating which part in the regulation table should be used. It does not indicate the content of regulation.

In performing regulation control, it is desirable to, since a connection request signal itself from a terminal to a network can be a congestion factor, regulate access itself from the terminal, from a viewpoint of avoiding network congestion. Therefore, it is desirable to minimize the list of conditions for regulation control by minimizing the resources of indicated information. Accordingly, in the present invention, by constructing the regulation table in advance, access regulation according to services is realized with a little information.

(Regulation Table)

An example of the regulation table will be described with reference to FIG. 2. The regulation table is configured by the items of regulation level, permission list, non-permission list. In this example, it is assumed that only one of the permission list and the non-permission list can be set for one regulation level.

For the regulation level "Level 1" in the regulation table shown in the figure, "imode.docomo.co.jp" is defined as the permission list which indicates items to be permitted, and other services are not permitted.

In the case of the regulation level "Level 2", "VoIP.docomo.co.jp" and "mopera.nttdocomo.co.jp" are defined as non-permission list which indicates items not to be permitted, and other services are permitted. Similar definition is also made for other regulation levels.

The content of the regulation table shown in the figure is only an example. Regulation control can be appropriately performed by appropriately setting the content.

Returning to FIG. 1, when the regulation level information indicated by the maintenance device 4 is "Level 1", transmission regulation control is performed based on the content of the regulation table. The imode (registered trademark) service can be used, while other VoIP services cannot be used.

When the regulation level information indicated by the maintenance device 4 is "Level 2", transmission regulation control is performed based on the content of the regulation table. VoIP services and the mopera (registered trademark) service cannot be used.

When the regulation level information is indicated by the maintenance device 4, a communication area is specified. By specifying the communication area, it is possible to regulate only terminals which are located in an area where traffic concentration may be caused by a disaster or an event.

(Configuration of Mobile Communication Terminal)

An example of the configuration of a mobile communication terminal will be described with reference to FIG. 3.

Figure 3:
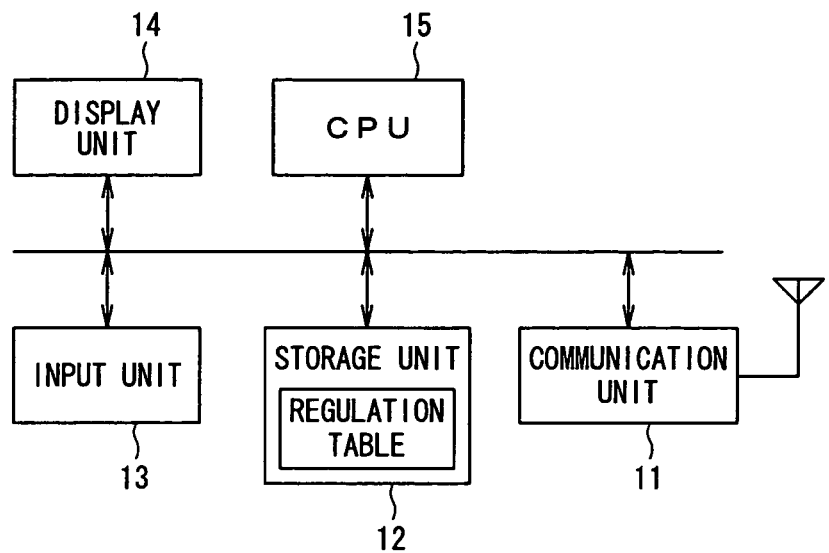
FIG. 3 is a block diagram showing an example of the configuration of the mobile communication terminal.

FIG. 3 is a block diagram showing an example of the configuration of a mobile communication terminal according to the present invention. In the figure, the mobile communication terminal according to this embodiment is a mobile machine configured to include a communication unit 11 for communicating with an external device within a network, a storage unit 12 for storing various information, an input unit 13 for inputting various information, a display unit 14 for displaying various information and a CPU (Central Processing Unit) 15 for controlling each unit.

In the storage unit 12, the regulation table described with reference to FIG. 2 is stored. This regulation table is written into the storage unit 12 when the contract of the mobile communication terminal is made (for example, when procedure for handing over the terminal is performed at the shop). However, it is possible to rewrite the content of the regulation table later. It is also possible to rewrite the content of the regulation table under the control of the CPU 15 by input to key buttons of the input unit 13 provided for the terminal or by download of data by OTA (Over The Air).

The input unit 13 also includes an operation button to be used when mobile communication is performed or various services are provided.

Figure 4:
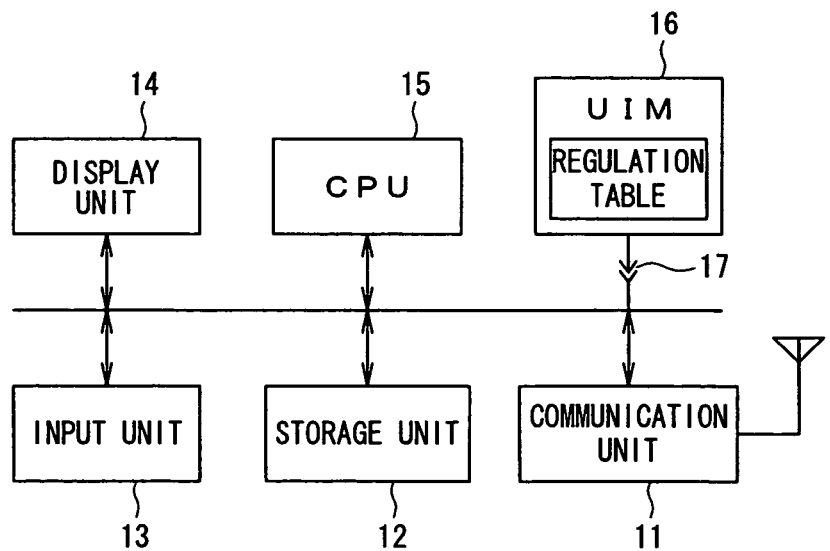
FIG. 4 is a block diagram showing another example of the configuration of the mobile communication terminal.

The regulation table may be stored in a storage medium, such as a UIM, which is configured to be removable from the mobile communication terminal. In this case, the mobile communication terminal is configured, for example, as shown in FIG. 4. In the figure, a UIM 16, which is a removable storage medium, is added to the configuration in FIG. 3, and the regulation table is stored in the UIM 16. This UIM 16 is removable from the mobile communication terminal with a connector 17, and it is inserted to the terminal and used for identification of a user. In a UIM (User Identity Module), contractor information is also stored.

(Regulation Processing)

Next, the content of regulation processing will be described with reference to FIGS. 5 and 6.

Figure 5:
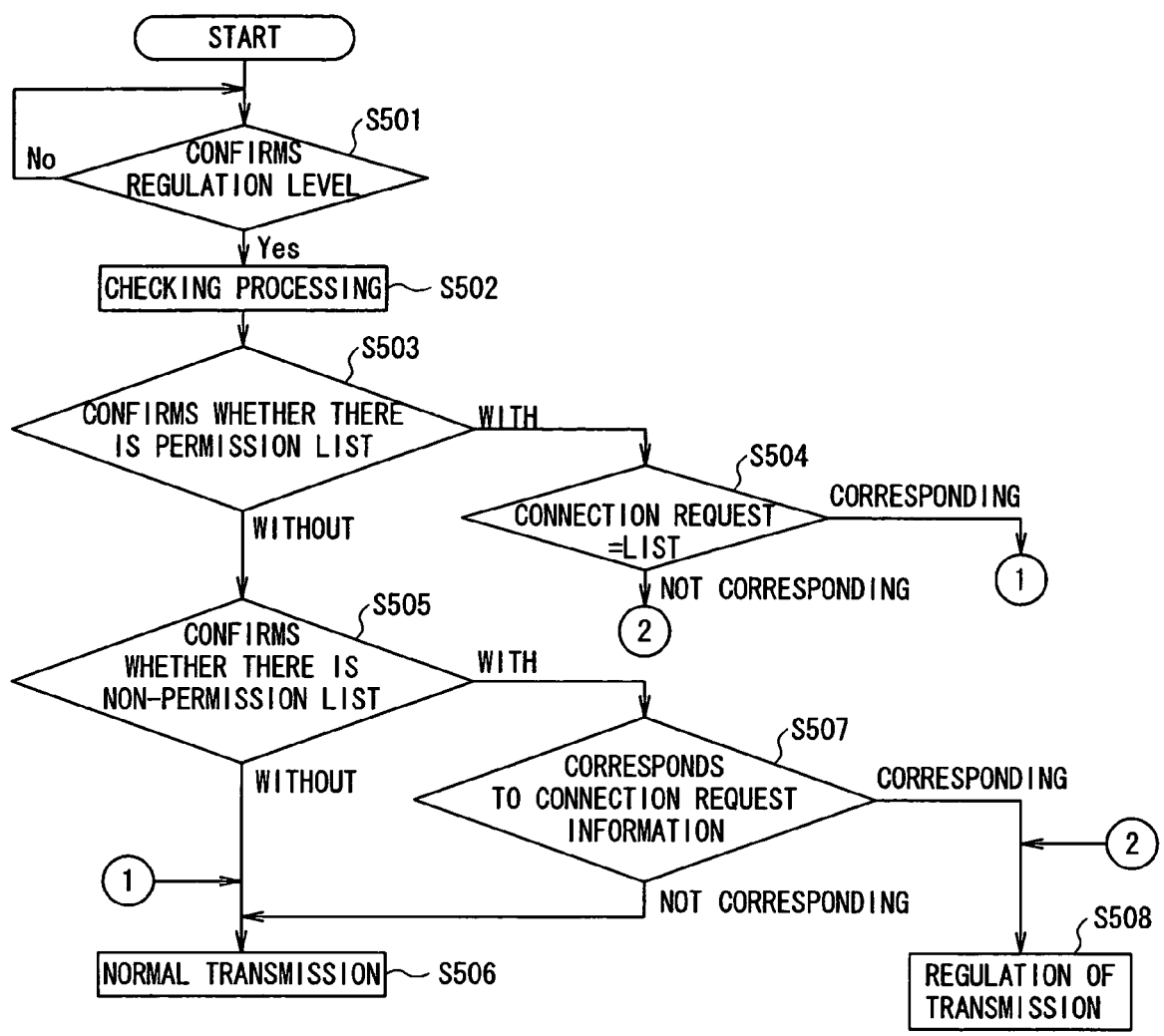
FIG. 5 is a flowchart showing an example of regulation processing performed based on the content of the regulation table.

In FIG. 5, the mobile communication terminal is in a waiting state until regulation level information is inputted from outside. When the regulation level information is inputted, the regulation level is confirmed (step S501). Next, checking processing is performed (step S502).

Figures 6, 7:
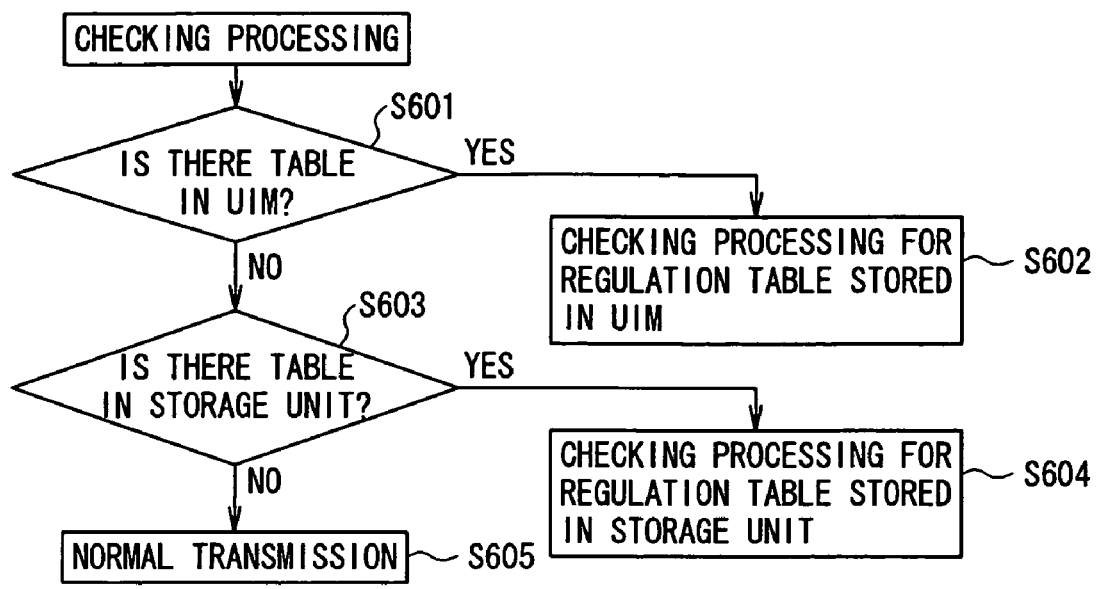
FIG. 6 is a flowchart showing an example of checking processing in FIG. 5.
FIG. 7 shows relation between the storage place of the regulation table and regulation control possibility/impossibility.

An example of the checking processing is shown in FIG. 6. In the figure, it is determined first whether or not a regulation table is stored in the UIM (step S601). If it is stored, then checking processing is performed for the regulation table stored in the UIM (step S602).

On the other hand, if a regulation table is not stored in the UIM, it is determined whether or not a regulation table is stored in the storage unit (step S601→step S603). If it is stored, then the checking processing is performed for the regulation table stored in the storage unit (step S604).

If the regulation table is stored neither in the UIM nor in the storage unit, then the process proceeds to normal transmission processing (step S603→step S605).

Returning to FIG. 5, if there is a permission list and the destination of the connection request by the terminal corresponds to any of the content of the permission list, normal transmission is performed (step S503→step S504→step S506). On the other hand, if the destination of the connection request by the terminal does not correspond to any of the content of the permission list, the transmission is regulated (step S503 →step S504→step S508).

If the permission list does not exist, it is confirmed whether there is a non-permission list (step S505). If the non-permission list does not exist, then normal transmission is performed (step S505→step S506). On the other hand, if the non-permission list exists and any of the content of the non-permission list corresponds to the destination of the connection request by the terminal, then the transmission is regulated (step S505→step S507→step S508). Even when the non-permission list exists, normal transmission is performed if any of the content of the non-permission list does not correspond to the destination of the connection request by the terminal (step S505→step S507→step S506).

In order to perform transmission regulation control based on the content of the regulation table as described above, it is necessary that the regulation table can be stored in the mobile communication terminal itself, or a UIM in which the regulation table is stored can be used. That is, as shown in FIG. 7, in the case of a terminal "capable of storage" of a regulation table and furthermore capable of using a UIM, the regulation table may be stored in the UIM or in the storage unit. On the other hand, in the case of a terminal which is not capable of using a UIM, the regulation table is to be stored in the storage unit. When the regulation table is stored in both of a UIM and the storage unit, the regulation table stored in the UIM, for example, is preferentially used.

In the case of a terminal "incapable of storage" of a regulation table, it does not have a function of controlling regulation (without capability) and is not targeted by regulation control. That is, it cannot enjoy the service according to the present invention.

(Application Examples)

Examples of performing regulation for each service will be described below.

(1) In a time of disaster, such as an earthquake and a flood, voice calls by circuit switching are regulated and controlled. Thereby, it is possible to provide a safety confirmation message board service or a mail sending/receiving service by means of packet exchange without regulation and enhance convenience of users.

(2) Accesses and communication in response to the request by the state or accesses and communication for the purpose of rescue by the police, the fire department, the self-defense force and the like are not regulated, and those for other purposes are regulated. Thereby, it is possible to give preference to public interest.

(3) Transmission of mails attached with an image or phone calls are regulated in a big event such as a festival and a concert. Thereby, it is possible to reduce or prevent congestion from being caused by traffic concentration due to simultaneous phone calls.

(4) Games and mail transmission are regulated in linkage with a GPS (Global Positioning System) or a position information service, in consideration of the situation or good manners at the current position. For example, regulation in an examination place, a concert hall, a movie theater and a museum is conceivable.

(Storage Medium)

In the communication system described above, a storage medium as described below can be used. That is, a storage medium which is removable from a mobile communication terminal, in which a regulation table is stored which specifies regulation rules for regulating transmission operation of the mobile communication terminal equipped with the storage medium, wherein transmission operation of the mobile communication terminal is regulated based on the content of the regulation table (corresponding to the UIM 16 in FIG. 4) can be used. By performing transmission regulation control in the mobile communication terminal equipped with the storage medium, the processing load on the network side can be reduced.

The present invention can be used in the case where necessary services are not to be regulated and other services are to be regulated in a mobile communication terminal.

What is claimed is:

1. A mobile communication terminal comprising:
storage means for storing a regulation table in which a regulation rule for regulating a transmission operation of the terminal is defined, the regulation table including at least one set of a regulation level, a permission list, and a non-permission list and any one of the permission list and the non-permission list being set for each of the regulation levels; and
transmission regulation control means for regulating the transmission operation based on a content of the regulation table stored in the storage means;
wherein the transmission regulation control means refers to the content of the regulation table according to regulation level information indicated from outside to regulate the transmission operation.

2. The mobile communication terminal according to claim 1, wherein the transmission regulation control means regulates the transmission operation related to each service which is provided with the use of packet communication.

3. The mobile communication terminal according to claim 1, further comprising rewriting means for rewriting the content of the regulation table, wherein the transmission regulation control means regulates the transmission operation based on the content of the regulation table rewritten by the rewriting means.

4. The mobile communication terminal according to claim 1, wherein the storage means is removable from the terminal.

5. The mobile communication terminal according to claim 1, wherein the transmission regulation control means regulates the transmission operation, when the regulation level information indicates a communication area where traffic concentration occurs and the mobile communication terminal is located.

6. The mobile communication terminal according to claim 1, wherein the transmission regulation control means regulates a voice call by means of circuit switching at a time of disaster.

7. The mobile communication terminal according to claim 1, wherein the transmission regulation control means does not regulate an access or communication for the purpose of rescue.

8. The mobile communication terminal according to claim 1, wherein the transmission regulation control means regulates a transmission of an e-mail with an image file or a telephone call at a time of an event.

9. The mobile communication terminal according to claim 1, wherein the transmission regulation control means regulates, in linkage with position information, playing of a game or a transmission of an e-mail in consideration of a situation or good manners.

10. A storage medium which is removable from a mobile communication terminal,
the storage medium including a regulation table which specifies a regulation rule for regulating a transmission operation of the mobile communication terminal equipped with the storage medium, the regulation table including at least one set of a regulation level, a permission list, and a non-permission list and any one of the permission list and the non-permission list being set for each of the regulation levels,
wherein the transmission operation of the mobile communication terminal is regulated by referring to a content of the regulation table according to regulation level information indicated from outside to regulate the transmission operation.

11. A mobile communication terminal comprising:
storage means for storing a regulation table in which a regulation rule for regulating a transmission operation of the terminal is defined, the regulation table including at least one set of a regulation level, a permission list, and a non-permission list and any one of the permission list and the non-permission list being set for each of the regulation levels;
transmission regulation control means for regulating the transmission operation based on a content of the regulation table stored in the storage means; and
rewriting means for rewriting the content of the regulation table;
wherein the transmission regulation control means regulates the transmission operation based on the content of the regulation table rewritten by the rewriting means.

12. The mobile communication terminal according to claim 11, wherein the transmission regulation control means regulates the transmission operation related to each service which is provided with the use of packet communication.

13. The mobile communication terminal according to claim 11, wherein the transmission regulation control means refers to the content of the regulation table according to regulation level information indicated from outside to regulate the transmission operation.

14. The mobile communication terminal according to claim 11, wherein the storage means is removable from the terminal.

15. A storage medium which is removable from a mobile communication terminal, the storage medium including a regulation table which specifies a regulation rule for regulating a transmission operation of the mobile communication terminal equipped with the storage medium, the regulation table including at least one set of a regulation level, a permission list, and a non-permission list and any one of the permission list and the non-permission list being set for each of the regulation levels, wherein:
a content of the regulation table is rewritten; and
the transmission operation on the mobile communication terminal is regulated based on the rewritten content of the regulation table.

* * * * *